(12) United States Patent
Shekhar et al.

(10) Patent No.: US 11,653,194 B2
(45) Date of Patent: May 16, 2023

(54) TECHNIQUES TO PROVIDE RESILIENCY AND OVERLOAD CONTROL FOR ACCESS AND MOBILITY MANAGEMENT FUNCTIONS

(71) Applicant: Cisco Technology, Inc., San Jose, CA (US)

(72) Inventors: Ravi Shekhar, Pune (IN); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 111 days.

(21) Appl. No.: 17/218,787

(22) Filed: Mar. 31, 2021

(65) Prior Publication Data
US 2022/0322065 A1 Oct. 6, 2022

(51) Int. Cl.
| | |
|---|---|
| *H04L 43/10* | (2022.01) |
| *H04W 8/08* | (2009.01) |
| *H04W 24/08* | (2009.01) |
| *H04W 48/16* | (2009.01) |

(52) U.S. Cl.
CPC ............... *H04W 8/08* (2013.01); *H04L 43/10* (2013.01); *H04W 24/08* (2013.01); *H04W 48/16* (2013.01)

(58) Field of Classification Search
CPC ....... H04W 8/08; H04W 24/08; H04W 48/16; H04L 43/10
See application file for complete search history.

(56) References Cited

U.S. PATENT DOCUMENTS

2020/0245236 A1\* 7/2020 Dubesset .............. H04L 67/148
2020/0359280 A1 11/2020 Li et al.

FOREIGN PATENT DOCUMENTS

| CN | 110536298 A | 12/2019 |
|---|---|---|
| CN | 111417151 A | 7/2020 |
| EP | 3588862 A1 | 1/2020 |
| WO | 2019222995 A1 | 11/2019 |
| WO | 2020063412 A1 | 4/2020 |
| WO | 2021007447 A1 | 1/2021 |

OTHER PUBLICATIONS

3GPP TS 23.501 V15.0.0, Technical Specification Group Services and System Aspects; System Architecture for the 5G System (5GS); Stage 2, Mar. 30, 2021, Release 17 (Year: 2021).\*

(Continued)

*Primary Examiner* — Said M Elnoubi
(74) *Attorney, Agent, or Firm* — Edell, Shapiro & Finnan, LLC (57) ABSTRACT

Presented herein are techniques to facilitate resiliency, overload control, and/or the like for an Access and Mobility Management Function (AMF) in a Third Generation Partnership Project (3GPP) mobile network architecture. In one instance, a method is provided that includes initiating, by a buddy AMF, a heartbeat exchange with a primary AMF. The method may further include identifying a status condition for the primary AMF by the buddy AMF based on the heartbeat exchange and providing a status indication to a radio access network node by the buddy AMF based on the status condition for the primary AMF.

20 Claims, 5 Drawing Sheets

(56) References Cited

OTHER PUBLICATIONS

3GPP TS 29.510, 5G system; Technical Specification Group Core Network and Terminals; Network Function Repository Services; Stage 3, Mar. 30, 2021, Release 17 (Year: 2021).*

3GPP, "3rd Generation Partnership Project; Technical Specification Group Core Network and Terminals; Numbering, addressing and identification; (Release 17)," 3GPP TS 23.003 V17.0.0 (Dec. 2020), 142 pages.

3GPP, "3rd Generation Partnership Project; Technical Specification Group Radio Access Network; NG-RAN; NG Application Protocol (NGAP) (Release 16)," 3GPP TS 38.413 V16.4.0 (Jan. 2021), 470 pages.

3GPP, "3rd Generation Partnership Project; Technical Specification Group Services and System Aspects; System architecture for the 5G System (5GS); Stage 2 (Release 17)," 3GPP TS 23.501 V17.0.0 (Mar. 2021), 489 pages.

3GGP, "3rd Generation Partnership Project; Technical Specification Group Services and System Aspects; Procedures tor the 5G System (5GS); Stage 2 (Release 16)," 3GPP TS 23.502 V16.8.0 (Mar. 2021), 608 pages.

C. Kersey, "Dynamic Feedback Protocol draft-eck-dfp-01," Cisco Systems, Inc., Network Working Group, Internet-Draft, Mar. 6, 2006, 22 pages.

R. Stewart, "Stream Control Transmission Protocol," Network Working Group, Standards Track, Sep. 2007, 152 pages.

Apis, "What is the 5G Unstructured Data Storage Function (UDSF) for?" Apis Training, retrieved from Internet Jan. 21, 2021, 5 pgs.

Techplayon, "5G NR Global Unique Temporary Identifier (GUTI)" Oct. 5, 2019, 6 pages, retrieved from http://www.techplayon.com/5g-nr-global-unique-temporary-identifier-guti/.

International Search Report and Written Opinion in counterpart International Application No. PCT/US2022/021680, dated Jul. 8, 2022, 15 pages.

"3rd Generation Partnership Project; Technical Specification Group Core Network and Terminals; 5G System; Network Function Repository Services; Stage 3 (Release 17)", 3GPP TS 29.510 V17.1.0, Mar. 30, 2021, 243 pages.

3GPP,"3rd Generation Partnership Project; Technical Specification Group Services and System Aspects; Procedures for the 5G System (5GS); Stage 2 (Release 17)," 3GPP TS 23.502, V17.0.0, Technical Specification, Mar. 2021, 646 pages.

3GPP, "3rd Generation Partnership Project; Technical Specification Group Core Network and Terminals Numbering, addressing and identification; (Release 17)," 3GPP TS 23.003, V17.1.0, Technical Specification, Mar. 2021, 143 pages.

\* cited by examiner

TECHNIQUES TO PROVIDE RESILIENCY AND OVERLOAD CONTROL FOR ACCESS AND MOBILITY MANAGEMENT FUNCTIONS

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of mobile network functions, such as Access and Mobility Management Functions (AMFs) in a Third Generation Partnership Project (3GPP) mobile network, becomes more critical. In particular, there are significant challenges in facilitating resiliency and overload control for AMFs in a 3GPP mobile network.

DESCRIPTION OF EXAMPLE EMBODIMENTS

Overview

Current 3GPP standards-based mechanisms for detecting an unplanned failure, a planned failure, or planned maintenance for an AMF at a radio access network node can be time consuming and inefficient. Techniques herein introduce the concept of a backup or 'buddy' AMF that can provide status information for a primary AMF instance on behalf of the primary AMF instance in order to overcome shortcomings of current 3GPP standards-based mechanisms for handling unplanned failures, planned failures, and/or planned maintenance involving the primary AMF instance.

In one instance, a method is provided that may include initiating, by a buddy AMF, a heartbeat exchange with a primary AMF; identifying a status condition for the primary AMF by the buddy AMF based on the heartbeat exchange; and providing a status indication to a radio access network node by the buddy AMF based on the status condition for the primary AMF.

Example Embodiments

As referred to herein, a wireless wide area (WWA) access network, such as a cellular/Third (3rd) Generation Partnership Project (3GPP) access networks, may be characterized as a Radio Access Network (RAN) having radio nodes, also sometimes referred to as RAN nodes, such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG or NG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, a RAN architecture can be implemented as a disaggregated virtualized RAN (vRAN) architecture that includes a functional disaggregation of a base station, such as a gNB, into various elements, including, but not limited to, a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component.

Figure 1:
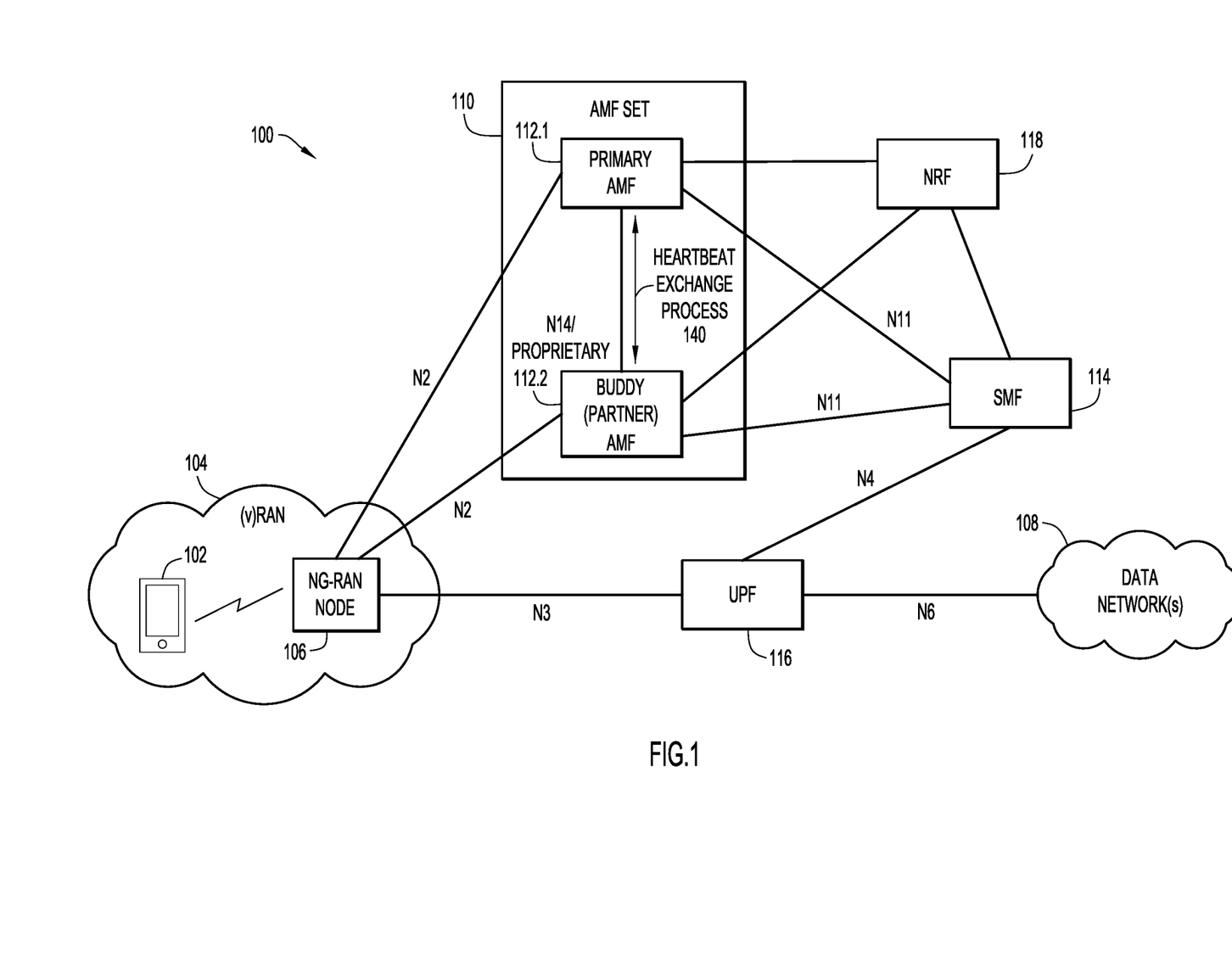
FIG. 1 is a diagram of a system in which techniques may be implemented to facilitate resiliency and overload control for an Access and Mobility Management Functions (AMF) in a Third Generation Partnership Project (3GPP) mobile network architecture, according to an example embodiment.

Referring to FIG. 1, FIG. 1 is a block diagram of a system 100 in which techniques may be implemented to facilitate resiliency and overload control for an Access and Mobility Management Functions (AMF) in a Third Generation Partnership Project (3GPP) mobile network architecture, according to an example embodiment. In at least one embodiment, the system 100 may include a virtualized and/or non-virtualized Radio Access Network 104 (referred to herein as a (v)RAN that may include any combination of virtualized and/or non-virtualized RAN nodes) that includes a next generation RAN (NG-RAN) node 106. The system 100 may further include an AMF set 110 that includes a primary AMF 112.1 and a partner or buddy AMF 112.2. As referred to herein the terms 'partner AMF' and 'buddy AMF' can be used interchangeably. System 100 may further include a Session Management Function (SMF) 114, a User Plane Function (UPF) 116, a Network Repository Function (NRF)

118, and a user equipment (UE) 102. Also shown in FIG. 1 are one or more data network(s) 108.

As illustrated in FIG. 1, UE 102 may interface with NG-RAN node 106 via one or more over-the-air Radio Frequency (RF) connections. The NG-RAN node 106 may further interface with UPF 116 via a 3GPP N3 interface and also with primary AMF 112.1 and buddy AMF 112.2 via corresponding 3GPP N2 interfaces. The primary AMF 112.1 and the buddy AMF 112.2 may interface via any combination of a 3GPP N14 interface and/or a proprietary interface for performing various operations as discussed for embodiments herein. The primary AMF 112.1 and the buddy AMF 112.2 may each further interface with the SMF 114 via corresponding 3GPP N11 interfaces. The SMF 114 may further interface with the UPF 116 via a 3GPP N4 interface and the UPF 116 may further interface with the data network(s) 108 via corresponding N6 interface(s). Each of the primary AMF 112.1, the buddy AMF 112.2, and the SMF 114 may further interface with the NRF 118.

In some instances, primary AMF 112.1, buddy AMF 112.2, SMF 114, and UPF 116 may represent a portion of a mobile core network for the system 100 of FIG. 1 in which the mobile core network may be configured as a 5G core or system (5GC/5GS), next Generation (nG) core or system (e.g., a Sixth Generation (6G) core/system, etc.), and/or the like as may be defined by 3GPP or other similar standards and may include any components, network elements, etc. in order to facilitate operations discussed herein. It is to be understood that the mobile core network for the system 100 of FIG. 1 may include other elements such as a Policy Control Function (PCF), a Unified Data Management (UDM) entity, a Unified Data Repository (UDR) entity, a Network Slice Selection Function (NSSF), etc., as may be prescribed by 3GPP standards. These elements are not illustrated for FIG. 1 for purposes of brevity only in order to illustrate other features associated with system 100.

In at least one embodiment, the (v)RAN 104 may be implemented as a 5G Access Network (5G-AN). An NG-RAN node, such as NG-RAN node 106 node of FIG. 1, may terminate any combination of a WWA (e.g., cellular) and/or WLA (e.g., Wi-Fi®) air interface for any combination of Radio Access Technology (RAT) types (sometimes referred to more generally as 'accesses') for (v)RAN 104 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

In some instances, NG-RAN node 106 can represent a collection of disaggregated vRAN nodes, such as an RU, a DU, and a CU (including a CU-UP and a CU-CP, in some instances). Generally, an RU may perform lower Physical (PHY) layer and RF operations to facilitate RF connections with one or more UE. The coverage area of a radio or RAN node such as an eNB, gNB, RU, NG-RAN node, etc. is typically referred to as a 'cell' in which one or more UE may attach to the radio node that serves the coverage area/cell. A DU (also sometimes referred to as a baseband unit) may provide lower level operations of the radio signal processing stack, such as Radio Link Control (RLC), Medium Access Control (MAC), and higher PHY layer operations, such as digital processing, including signal modulation, encoding, and scheduling, among others. A CU-UP may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU-UP can be varied depending on implementation and/or configuration of a given (v)RAN architecture. A CU-CP generally operates to control DU(s) and the CU-UP for a (v)RAN architecture via Radio Resource Control (RRC) functions and the control plane part of the PDCP protocol.

Thus, an NG-RAN node, such as NG-RAN node 106 of FIG. 1, may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as the UE 102 shown in FIG. 1, may connect to the NG-RAN node for one or more sessions (e.g., voice, video, data, gaming, combinations thereof, etc.).

A UE, such as UE 102 shown in FIG. 1, may be associated with any user, subscriber, employee, client, customer, electronic device, etc. wishing to initiate a flow in system 100 of FIG. 1 and may be inclusive of any device that initiates a communication in the system, such as a computer, an electronic device such as an industrial device, automation device, enterprise device, appliance, Internet of Things (IoT) device, etc., a laptop or electronic notebook, a WWA/WLA (cellular/Wi-Fi®) enabled telephone/smart phone, tablet, etc. and/or any other device, component, element, or object capable of initiating voice, audio, video, media, or data exchanges within the system. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.), controllers, software, logic, and/or any other elements/entities that may facilitate over-the-air RF connections with one or more access networks, such as with NG-RAN node 106 of (v)RAN 104.

In addition to various operations discussed for techniques herein, an AMF may facilitate access and mobility management control/services for one or more UE, such as UE 102, to facilitate one or more over-the-air Radio Frequency (RF) connection(s) between the UE 102 and the (v)RAN provided via the NG-RAN node 106. In addition to various operations discussed for techniques herein, an SMF, such as SMF 114 may be responsible for UE Protocol Data Unit (PDU) session management (SM), with individual functions/services being supported on a per-session basis in order to facilitate data transfer(s) between a UE and one or more data network(s). Typically, the NRF 118 provides support for Network Function (NF) management (e.g., registering, deregistering, updating services to NFs/NF services), NF discovery (e.g., enabling NF service consumer(s) to discover a set of NF instances with a specific NF service/NF type and/or to discover a specific NF service), and NF access (e.g., NF authorization). Generally, a UPF, such as UPF 116, may operate as a Virtual or Virtualized Network Function (VNF) to provide packet routing and forwarding operations for user data traffic and may also perform a variety of functions such as packet inspection, traffic optimization, Quality of Service (QoS), policy enforcement and user data traffic handling, and billing operations (e.g., accounting, etc.) for UE 102 sessions.

In various embodiments, the data network(s) 108 of FIG. 1 may be any combination of the Internet, an Internet Protocol (IP) Multimedia Subsystem (IMS), Ethernet network, Ethernet switching system(s), and/or the like.

The 5G core network architecture, as prescribed at least by 3GPP Technical Specification (TS) 23.501 and TS 23.502, introduces the concept of an AMF set for grouping of AMFs to serve a given area and, in some instance, a number of network slices. An AMF is identified by an AMF name, such as a Fully Qualified Domain Name (FQDN) (e.g., amf1.cluster1.net1.amf.5gc.mnc011.mcc234.3gppnetwork.org), and can be configured with one or multiple Globally Unique AMF ID (GUAMI)). 3GPP defines the GUAMI structure as:

<GUAMI>:=<MCC><MNC><AMF Region ID><AMF Set ID><AMF Pointer>

Included in the GUAMI structure is a Mobile Country Code (MCC), a Mobile Network Code (MNC), an AMF Region ID that identifies the region served by the AMF, an AMF Set ID that uniquely identifies the AMF Set within the AMF Region and an AMF Pointer that identifies one or more AMFs within the AMF Set. At any given point, a GUAMI with a distinct AMF Pointer is associated to only one AMF name.

In some instances, a standalone AMF or AMF within an AMF set (also sometimes referred to as an AMF instance) may become unavailable for various reasons such as for planned maintenance or due to an unplanned failure (e.g., due to software and/or hardware issues). In the case of an AMF failure, sessions handled by the AMF are to be migrated to an alternate AMF instance.

Current 3GPP specifications such as 3GPP TS 23.501 and TS 23.502 provide some approaches to deal with such issues including configuration a backup AMF for storing UE session/call context information managed by a given AMF, configuring an Unstructured Data Storage Function (UDSF) in the network at which the session/call contexts can be stored and used by a new AMF for session restoration, and/or, in the case of planned maintenance, informing an NG-RAN node, by the AMF for which the maintenance is planned, that the AMF will be unavailable in which the AMF will inform the RAN node to reconfigure the weight factor for the AMF to be zero (0) to stop the load of traffic for the AMF by the RAN node However, currently there is no standards-based mechanism to inform an NG-RAN node regarding an unplanned failure of an AMF instance. Rather, standards-based mechanisms rely on an NG-RAN node discovering an AMF failure through detection of a transport network failure (interconnecting the NG-RAN node and the AMF), which can be inefficient and time consuming.

To deal with planned maintenance and planned failures, the 3GPP standards provide an option to configure backup AMF for each AMF instance in an AMF Set. The backup AMF can take over the primary AMF in case of a planned AMF failure for maintenance. For example, an AMF can dynamically update an NRF with the new or updated GUAMI(s) to provide mapping between GUAMI(s) and AMF information. An AMF may also provide backup AMF information to the NRF for handling a planned failure for maintenance of the AMF instance. For a planned failure involving maintenance of the AMF instance, the backup AMF takes over when the indicated GUAMI associated with primary AMF is unavailable. Based on that information, one GUAMI is associated with an AMF and optionally with a backup AMF used for planned removal and/or another (same or different) backup AMF used for failure.

3GPP TS 38.413 defines an AMF service or status indication message that an AMF can use to indicate its status to an NG-RAN node, for example, for a planned failure. Upon obtaining the status indication message from a particular AMF indicating a planned failure, the NG-RAN marks the indicated GUAMI(s) for the particular AMF as unavailable. The particular AMF may include the backup AMF name (FQDN) in the AMF status indication message, which can be used by the NG-RAN node during an AMF re-selection procedure.

Thus, there are gaps in the existing approaches provided by 3GPP standards involving both unplanned failures, planned maintenance, and planned failures. For example, the 3GPP standards-based approach works only for a planned AMF shutdown when an AMF instance reports its status to the 5G-AN or NG-RAN node before it goes down. Yet, most AMF failures will be ungraceful and in such cases, the NG-RAN will not receive the 3GPP prescribed status indication. Additionally, there are chances of an AMF status indication being lost or not being sent from the dysfunctional AMF instance before it goes down. Further, the current standards-based mechanism of detecting an unplanned AMF failure is time consuming, depends on N2 tunnel failure detection, and is inefficient.

Moreover, 3GPP standards-based mechanisms for load balancing and overload control are performed through initial/configured weight factors that are static. For better load balancing, it would be advantageous to utilize real-time load factors. For example, dynamic load factor reporting may be advantageous to avoid AMF instances becoming overloaded. However, the current standards-based procedure for handling overload scenarios (by sending an AMF status indication by an overloaded AMF) is not sufficient and cannot be relied upon.

In accordance with techniques discussed herein, the system 100 of FIG. 1 may overcome shortcomings of current standards-based mechanisms by providing an efficient technique to inform an NG-RAN node, such as NG-RAN node 106, regarding a failure of a primary AMF, such as primary AMF 112.1, or other status information of the primary AMF 112 through another AMF instance, such as a partner or buddy AMF, such as buddy AMF 112.2 that is part of the AMF set 110 to which the primary AMF 112.1 belongs.

As referred to herein, a partner or buddy AMF, such as buddy AMF 112.2 is an AMF instance that is authorized to report the status of a primary AMF, such as primary AMF 112.1, in case of a failure, overload situation, or other status condition of the primary AMF that is to be reported to a 5G-AN and/or NG-RAN node, such as NG-RAN node 106.

In various embodiments, a buddy AMF can either be statically configured for each AMF in an AMF set and/or a buddy AMF can be dynamically assigned by sharing authorization keys of primary AMF to a buddy AMF. Additionally, a buddy AMF can share the authorization keys for a primary AMF, to facilitate communications with the 5G-AN and/or NG-RAN node, until the primary AMF comes back into service. In various embodiments, authentication and authorization keys for the primary AMF 112.1 can include Non-Access Stratum (NAS) security keys derived for UE session(s) served by the primary AMF (e.g., Extensible Authentication Protocol (EAP) keys, $K_{AMF}$, etc.), NG-RAN security contexts (e.g., $K_{gNB}$, $K_{NG-RAN}$, etc.), and/or information elements (IEs) (e.g., ngKSI, HashAMF, selected Evolved Packet System (EPS) NAS security algorithm), and/or the like. The buddy AMF 112.2 can also obtain the GUAMI(s) of the primary AMF 112.1. The buddy AMF 112.2 is authorized use this information to report status conditions to the NG-RAN node 106 for the primary AMF 112.1, such as failure conditions, an overload condition, event(s), alarm(s), and/or any other status conditions on behalf of the primary AMF 112.1.

In various embodiments, the relationship between a primary AMF, such as primary AMF 112.1, and a buddy AMF, such as buddy AMF 112.2, can be permanent (e.g., pre-configured) or temporary (e.g., decided at run-time after learning the failure of an AMF in an AMF set). In various embodiments, the buddy AMF 112.2 can obtain the GUAMI(s) and authorization keys of the primary AMF 112.1 upon the buddy AMF 112.2 registering with the NRF 118, upon the buddy AMF 112.2 being configured or assigned to the primary AMF 112.1, and/or the like.

Context for UE session(s) handled by the primary AMF 112.1 can also be provided for the buddy AMF 112.2. For example, in some embodiments, the primary AMF 112.1 can provide context information to the buddy AMF 112.2 for each session created for the primary AMF 112.1 (e.g., using a push mechanism). In some embodiments, UE contexts can be obtained by the buddy AMF 112.2 from the primary AMF 112.1 (e.g., using a pull mechanism). Any other mechanisms for providing and/or otherwise sharing UE contexts between AMFs may be utilized in accordance with embodiments herein.

In various embodiments during operation, techniques herein may provide for the ability of a partner or buddy AMF, such as buddy AMF 112.2, to determine a failure of a primary AMF, such as AMF 112.1 through a heartbeat exchange processes 140, as shown in FIG. 1, which can be initiated by the buddy AMF 112.2, as discussed in further detail herein. Upon determining the failure of the primary AMF 112.1, the buddy AMF 112.2 can facilitate reconfiguring the weight factor of the failed primary AMF 112.1 to zero (0) by providing a status indication from the buddy AMF 112.2 to the NG-RAN node 106, which can trigger the NG-RAN node 106 to stop sending any new sessions to the failed primary AMF 112.1. Further, the status indication can provide for establishing with the NG-RAN node 106 that the buddy AMF 112.2 as the backup for the failed primary AMF 112.1. It is assumed for embodiments herein, that the NG-RAN node 106 will be configured to allow status indications to be received from any combination of an anchor or primary AMF, such as primary AMF 112.1, and a buddy AMF, such as buddy AMF 112.2.

As noted above, the buddy AMF 112.2 can report status conditions for the NG-RAN node 106 on behalf of the primary AMF 112.1, which may provide various advantages for the system 100 of FIG. 1 over 3GPP standards-based approaches involving AMFs in terms of resiliency and load balancing that, may be facilitated via the system 100.

Regarding resiliency, the buddy AMF 112.2 can monitor the health of the primary AMF 112.1 utilizing a heartbeat exchange process 140 via the N14 or proprietary interface in which the buddy AMF 112.2 initiates the process 140 by transmitting a heartbeat query message to the primary AMF 112.1. If the primary AMF 112.1 has not failed/is not experiencing a failure, the primary AMF 112.1 can respond to the heartbeat query message with a heartbeat response message that include health and/or status condition information, such as a load factor for the primary AMF 112.1, one or more alarm(s) and/or alarm information for the primary AMF 112.1 (e.g., PCF unavailable alarm an overload alarm, etc.), event(s) (e.g., addition of an AMF instance, addition of NF instances such as SMF, PCF, etc.), and/or any other status condition information for the primary AMF 112.1.

However, if the primary AMF 112.1 stops responding to the heartbeat query message, then after one or more misses in which the buddy AMF 112.2 does not receive a heartbeat response message from the primary AMF 112.1, the buddy AMF 112.2 can mark the primary AMF 112.1 as dead and can report a status indication to the NG-RAN node 106 using an enhanced status indication message transmitted to the NG-RAN node 106 that indicates the unavailability of the primary AMF 112.1. In some embodiments, a threshold number of instances for which the buddy AMF 112.2 does not receive a heartbeat response from the primary AMF 112.1 may be utilized to trigger identifying the primary AMF 112.1 (e.g., if the buddy AMF 112.2 does not receive responses for an 'N' number of heartbeat queries).

The enhanced status indication message transmitted by the buddy AMF 112.2 can include the GUAMI(s) of the primary AMF 112.1 and can also identify buddy AMF information for the buddy AMF 112.2, such as the FQDN and GUAMI(s) of the buddy AMF 112.2, which cause the NG-RAN node 106 to perform one or more actions based on the status indication obtained from the buddy AMF 112.2. In one embodiment, the one or more actions performed by the NG-RAN node 106 may include initiating a switchover of primary AMF 112.1 traffic from the primary AMF 112.1 to the buddy AMF 112.2.

Regarding load balancing and/or other status conditions for the primary AMF 112.1, the primary AMF 112.1 can report load, event(s), alarm(s), alarm information, etc. to the buddy AMF 112.2 as part of heartbeat response messages sent to the buddy AMF 112.2 for instances in which the primary AMF has not failed/is not experiencing a failure, and the buddy AMF 112.2 is authorized to report status conditions for the primary AMF 112.1. For example, in some instance, the buddy AMF 112.2 can report a change in load information and/or any other dynamic load factor for the primary AMF 112.1 to the NG-RAN node 106 using an enhanced status indication message immediately, upon determining a change from last reported information from the primary AMF 112.1, and/or the like.

The NG-RAN node 106 can use the dynamically reported status indication information to perform one or more actions. For example, the NG-RAN node 106 can perform real-time load balancing for between the primary AMF 112.1 and other AMFs of the AMF set 110, such as buddy AMF 112.2 and/or any other AMFs. In another example, the buddy AMF 112.2 may determine that the primary AMF 112.1 is overloaded and can report this event to the NG-RAN node 106, as the primary AMF 112.1 may fail or otherwise not be able to report the event to the NG-RAN node 106 due to its heavy load.

Thus, features of system 100 can help to avoid the AMF(s) from getting overloaded, as the 5G-AN or NG-RAN node(s), can receive load information for AMF(s) that are more loaded as compared to other available AMF(s).

In contrast to current 3GPP standards, current standards-based approaches for failure detection and load balancing are limited and inefficient and do not provide for the concept of a buddy AMF having features of the buddy AMF 112.2 described herein that can be trusted to report status information/indication(s) for a primary AMF to a 5G-AN and/or NG-RAN node, such as (v)RAN 104 and/or NG-RAN node 106.

As contrasted with 3GPP TS 23.501, the current standards-based approach involving a newly selected/target AMF that is to become a serving AMF is to re-assign a Global Unique Temporary Identifier (GUTI) (using its own GUAMI(s)) to UEs to be served by the selected AMF. However, the solution provided by system 100 does not involve this overhead; rather, the GUAMI(s) of the primary AMF 112.1 are shared with the buddy AMF 112.2. Thus, GUTI reassignment for UE 102 is not involved for the solution provided by system 100.

As further contrasted with 3GPP TS 23.501, the current standards-based approach for UE(s) in connected mode that are moved from one AMF instance to another AMF instance, as described in clause 5.21.2, involves the (old) AMF from which the UE(s) are moved to deregister itself with the NRF. However, deregistration of the old AMF is a flaw in the standards-based approach as deregistration makes the old AMF unavailable, which may not be useful for instances in which the old AMF was merely overloaded and not unavailable. Such deregistering of the old AMF triggers movement of any UEs connected with the old AMF to the new AMF. In contrast, the solution provided by system 100 does not involve the primary AMF 112.1 deregistering from the NRF 118 if it is unavailable, thereby avoiding the shortcomings of the standards-based approach.

Moreover, existing standards-based procedures typically involve a UDSF deployment, which is costly and multiple transactions from the UDSF can add to signaling latency. In contrast, the solution provided by system 100 fills gaps in the standards-based approaches and can facilitate fast utilizing of a buddy AMF for various potential primary AMF issues without introducing new system nodes.

Figure 2:
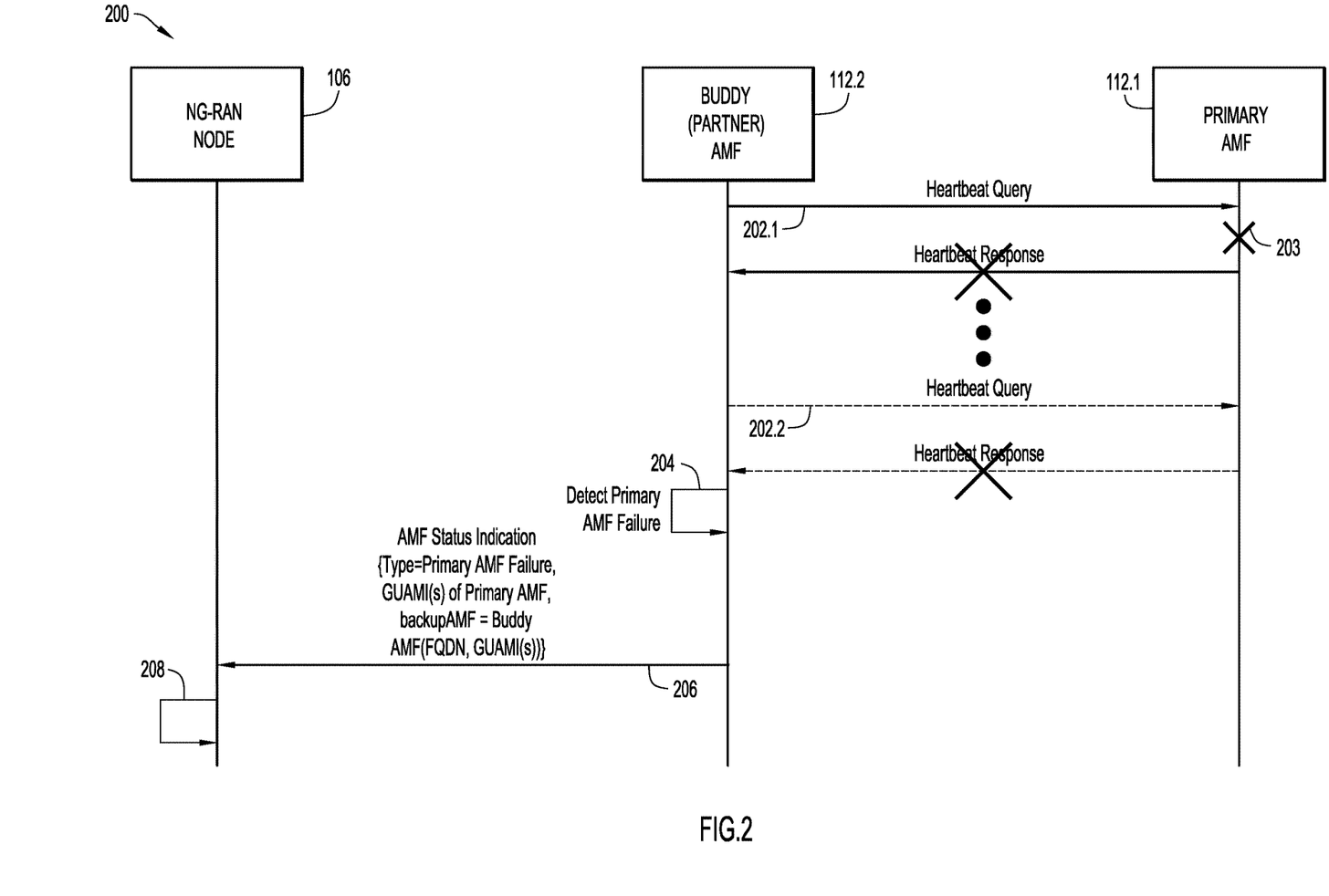
FIG. 2 is a message sequence diagram illustrating a call flow associated with facilitating AMF resiliency for an example use case involving a primary AMF failure, according to an example embodiment.

Additional operations details are discussed with reference to FIGS. 2 and 3, discussed below, in which FIG. 2 is a message sequence diagram illustrating a call flow 200 associated with facilitating AMF resiliency for an example use case involving a primary AMF failure, according to an example embodiment. FIG. 2 includes NG-RAN node 106, primary AMF 112.1, and buddy AMF 112.2.

For the embodiment of FIG. 2, consider that the buddy AMF 112.1 initiates a heartbeat exchange with the primary AMF 112.2 by transmitting, at 202.1, a first heartbeat query message to the primary AMF 112.1 via the N14 interface or a proprietary interface interconnecting the primary AMF 112.1 and the buddy AMF 112.2. In at least one embodiment, a heartbeat query message may be a new message type that may carry a flag or other value indicating, at least in part, that the message is a heartbeat query message. In some instances, a heartbeat query message may include other information such as uptime information, cluster ID, set ID, service IDs, etc.

At 203, consider that there is a failure associated with the primary AMF 112.1, such that the primary AMF cannot respond to the heartbeat query. Thus, for the embodiment of FIG. 2, buddy AMF 112.2 upon not receiving a response to the query at 202.1 can detect or otherwise determine that the primary AMF has failed, as shown at 204. In some embodiments, the buddy AMF 112.2 can detect a failure of the primary AMF 112.1 if a response is not received within a particular amount of time from sending the query (e.g., within several seconds). In some embodiments, the buddy AMF 112.2 can send multiple heartbeat query messages, as shown at 202.2, and can detect a failure of the primary AMF 112.1 if no responses are received from the primary AMF 112.1, if a threshold number of responses are not received from the primary AMF 112, if a threshold number of responses are not received in a threshold amount of time from the primary AMF 112.1, and/or the like. Thus, multiple techniques and/or conditions may be utilized by a buddy AMF to determine a failure of a primary AMF in accordance with embodiments herein.

Upon detecting a failure of the primary AMF 112.1 at 204, the buddy AMF can transmit an enhanced AMF status indication message to the NG-RAN node 106, as shown at 206. The enhanced AMF status indication message transmitted at 206 may include a message type indication (e.g., a bit, flag, Information Element (IE), etc.) indicating a failure of the primary AMF 112.1, GUAMI(s) of the primary AMF 112.1, and in indication that the backup AMF for the primary AMF 112.1 is buddy AMF 112.2 (e.g., backupAMF=buddy AMF). In at least one embodiment, the indication of the backup AMF can identify the buddy AMF name (e.g., FQDN) and one or more GUAMI(s) for the buddy AMF.

Obtaining the status indication indicating a failure of the primary AMF 112.1 can cause the NG-RAN node 106 to perform one or more actions, as shown at 208. For example, the one or more actions at 208 may include triggering the NG-RAN node 106 to stop sending new UE session(s) to the primary AMF 112.1 and sending the new session(s) to the buddy AMF 112.2 instead. Other actions can be envisioned, such as, for example, adjusting weighting factors for the primary AMF 112.1, etc.

Thus, as illustrated in FIG. 2, embodiments herein can facilitate resiliency for an AMF by a buddy AMF.

Figure 3:
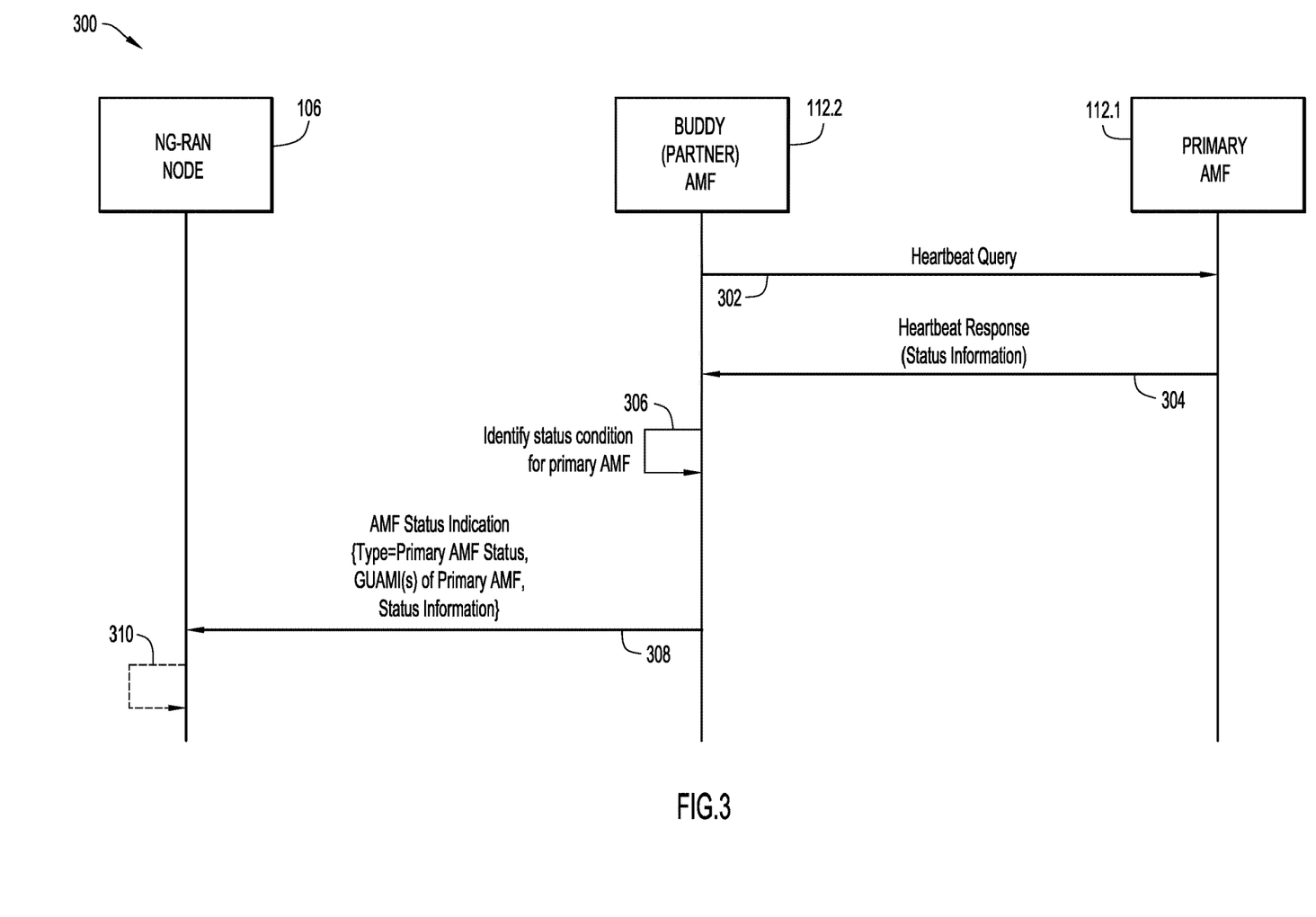
FIG. 3 is a message sequence diagram illustrating a call flow associated with facilitating AMF overload control for an example use case involving a primary AMF overload scenario, according to an example embodiment.

Referring to FIG. 3, FIG. 3 is a message sequence diagram illustrating a call flow 300 associated with facilitating AMF overload control for an example use case involving a primary AMF overload scenario, according to an example embodiment. FIG. 3 includes NG-RAN node 106, primary AMF 112.1, and buddy AMF 112.2.

For the embodiment of FIG. 3, consider that the buddy AMF 112.2 initiates a heartbeat exchange with the primary AMF 112.1 by transmitting, at 302, a heartbeat query message to the primary AMF 112.1 via the N14 interface or a proprietary interface interconnecting the primary AMF 112.1 and the buddy AMF 112.2. As noted above, in at least one embodiment, a heartbeat query message may be a new message type that may carry a flag or other value indicating, at least in part, that the message is a heartbeat query message.

At 304, consider that primary AMF 112.1 responds to the heartbeat query with a heartbeat response message that includes status information for the primary AMF 112.1. In various embodiments, status information can carried in one or more status indicators, such as an overload indicator, a current load factor indicator (e.g., a percentage or value to indicate a current loading of an AMF), a desired load factor indicator (e.g., for an AMF that seeks to manage its load), a percent utilization of resources (e.g., hardware resources, software resources, etc.), one or more event indicator(s), one or more alarm indicator(s), combinations thereof, and/or the like.

Obtaining status information for the primary AMF 112.1 can cause the buddy AMF 112.2 to identify a status condition for the primary AMF 112.1, as shown at 306, which can trigger the buddy AMF 112.2 to transmit an enhanced AMF status indication message to the NG-RAN node 106 including status information for the primary AMF 112.1, as shown at 308. The enhanced AMF status indication message transmitted at 308 may include a message type indication (e.g., a bit, flag, IE, etc.) indicating a status message for the primary AMF 112.1, GUAMI(s) of the primary AMF 112.1, and any status information for the primary AMF 112.1. Thus, the buddy AMF 112.2 facilitates sending the status of the primary AMF 112.1 to the NG-RAN node 106.

In some embodiments, the status information sent to the NG-RAN node 106 from the buddy AMF 112.2 may be the status information received by the buddy AMF 112.2 from the primary AMF 112.1. In some embodiments, the status information sent to the NG-RAN node 106 from the buddy AMF 112.2 may be different from the status information received by the buddy AMF 112.2 from the primary AMF 112.1.

For example, in some instances, status information sent from the buddy AMF 112.2 may be an overload indicator or a loading factor of the primary AMF 112.1 that the primary AMF 112.1 sends to the buddy AMF 112.2. In some instances, status information sent from the buddy AMF 112.2 may be an indication that the buddy AMF 112.2 has derived or otherwise determined from one or more status indicators received from the primary AMF 112.1. For example, the buddy AMF 112.2 may determine an event for the primary AMF such as a change in loading for the primary AMF 112.1 over a period of time, that the primary AMF 112.1 is overloaded (e.g., through additional information), etc. which may trigger the buddy AMF 112.2 to report the increased load of the primary AMF 112.1 to the NG-RAN node 106. Other variations and/or reporting information can be envisioned.

Obtaining the status indication indicating status information of the primary AMF 112.1 can cause the NG-RAN node 106 to perform one or more actions, in at least one embodiment, as shown at 310. For example, upon determining that the primary AMF 112.1 is overloaded or experiencing an increased load, the one or more actions that may be performed by the NG-RAN node the at 310 may include triggering the NG-RAN node 106 to update a loading weight factor for the primary AMF 112.1. Other variations can be envisioned for one or more actions performed by the NG-RAN node 106 depending, for example, on the status information received for the primary AMF 112.1.

Thus, as illustrated in FIG. 3, embodiments herein can facilitate status reporting for an AMF by a buddy AMF.

Figure 4:
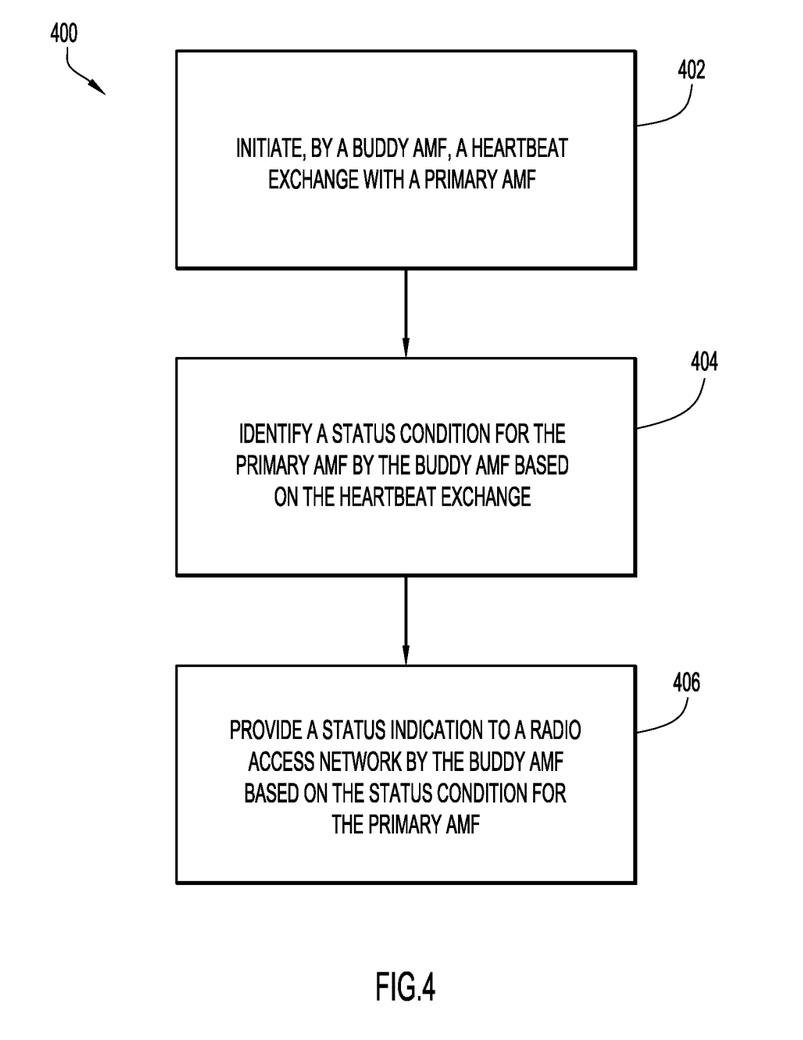
FIG. 4 is a flow chart depicting a method according to an example embodiment.

Referring to FIG. 4, FIG. 4 is a flow chart depicting a method 400 according to an example embodiment. In at least one embodiment, method 400 illustrates example operations that may be performed, at least in part, by a buddy AMF, such as buddy AMF 112.2, in order to facilitate resiliency and overload control for a primary AMF in a 3GPP mobile network architecture, according to an example embodiment.

Consider, at 402 that the method may include initiating, by a buddy AMF, a heartbeat exchange with a primary AMF. In one instance, the heartbeat exchange can be performed using an N14 interface interconnecting the buddy AMF and the primary AMF. In one instance, the heartbeat exchange can be performed using a proprietary interface interconnecting the buddy AMF and the primary AMF. In one instance, initiating the heartbeat exchange by the buddy AMF may include transmitting a heartbeat query to the primary AMF by the buddy AMF.

At 404, the method may include, identifying a status condition for the primary AMF by the buddy AMF based on the heartbeat exchange. At 406, the method may include providing a status indication to a radio access network node by the buddy AMF based on the status condition for the primary AMF.

In one instance, identifying the status condition for the primary AMF includes determining, by the buddy AMF, whether a heartbeat response to the heartbeat query is received from the primary AMF and, based on determining that a heartbeat response is not received from the primary AMF, identifying a failure of the primary AMF. In this instance, the status indication provided to the radio access network node can indicate that the primary AMF has failed. The status indication can further include at least one GUAMI for the primary AMF and identifying information for the buddy AMF. In one instance, the identifying information for the buddy AMF can include at least one of a Fully Qualified Domain Name (FQDN) for the buddy AMF and at least one GUAMI for the buddy AMF.

In one instance, identifying the status condition for the primary AMF by the buddy AMF may include, based on determining that a heartbeat response is received, determining whether one or more status indicators for the primary AMF are included in the heartbeat response and, based on determining that one or more status indicators for the primary AMF are included in the heartbeat response, identifying the status condition for the primary AMF. In one instance, the status indication provided to the radio access network node can include at least one GUAMI for the primary AMF and the one or more status indicators can indicate at least one of a an overload condition of the primary AMF, a load factor value for the primary AMF, a status event for the primary AMF, and a status alarm for the primary AMF.

Other operations may be performed in accordance with techniques herein. For example, in one instance the method may include performing one or more actions by the radio access network node based on the status indication.

Figure 5:
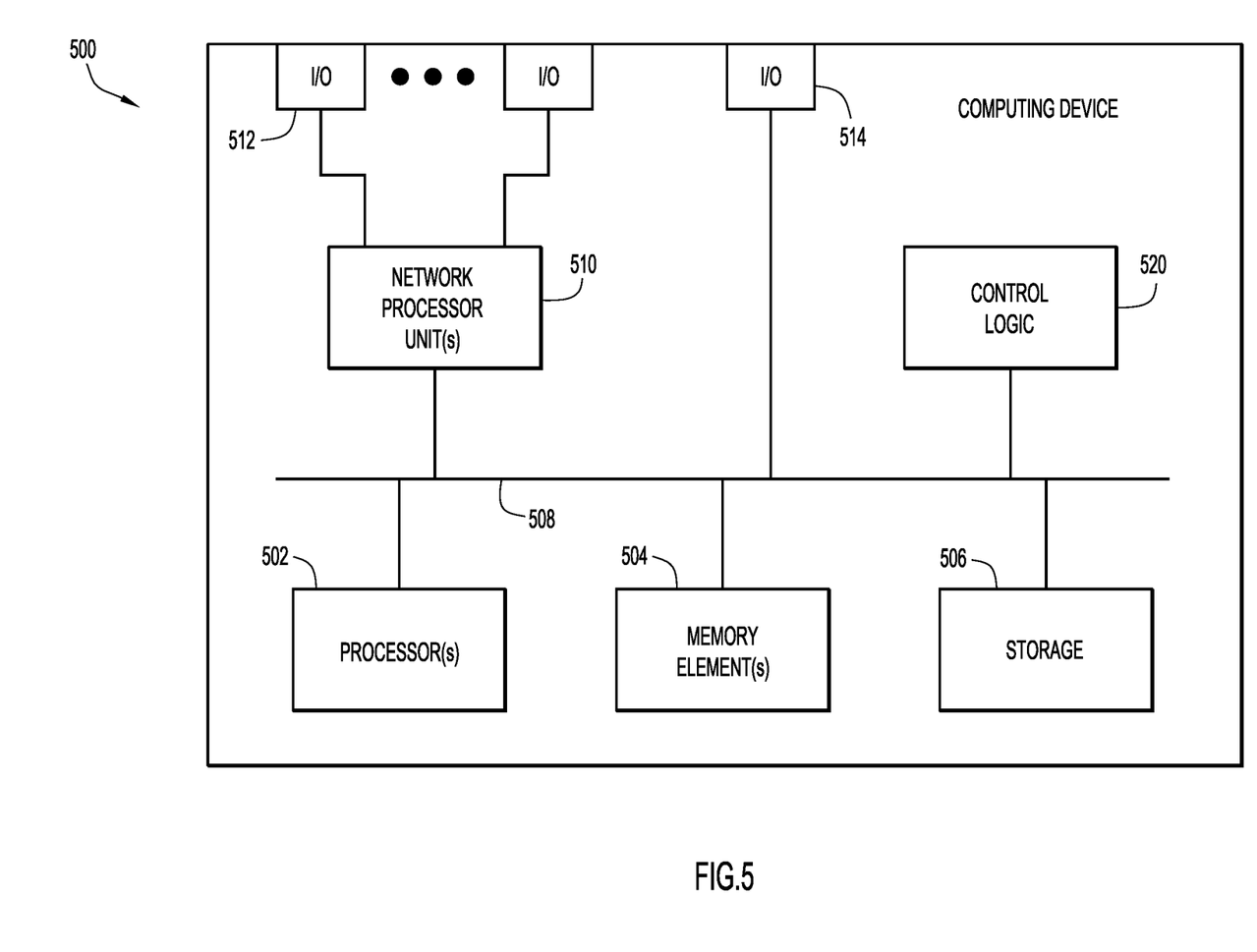
FIG. 5 is a hardware block diagram of a computing device that may perform functions associated with any combination of operations, in connection with the techniques presented herein.

Referring to FIG. 5, FIG. 5 illustrates a hardware block diagram of a computing device 500 that may perform functions associated with operations discussed herein. In various embodiments, a computing device, such as computing device 500 or any combination of computing devices 500, may be configured as any entity/entities as depicted herein in order to perform operations of the various techniques discussed herein, such as operations that may be performed by a buddy AMF, such as buddy AMF 112.2.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device. Processor(s) 502 (e.g., hardware processor(s)) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 520 can include instructions that, when executed, cause processor(s) 502 to perform operations including, but not limited to, initiating a heartbeat exchange with a primary AMF, identifying a status condition for the primary AMF based on the heartbeat exchange, and providing a status indication to a radio access network node based on the status condition for the primary AMF.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

For embodiments in which computing device 500 may be configured as an NG-RAN node, the computing device may additionally include any combination of hardware (e.g., communications units, receiver(s), transmitter(s), transceiver(s), antenna(s) and/or antenna array(s), processor(s), memory element(s), baseband processor(s) (modems), etc.), controllers, software, logic, and/or any other elements/entities that may facilitate over-the-air RF connections.

In one form, a computer-implemented method is provided that may include initiating, by a buddy access and mobility management function (AMF), a heartbeat exchange with a primary AMF; identifying a status condition for the primary AMF by the buddy AMF based on the heartbeat exchange; and providing a status indication to a radio access network node by the buddy AMF based on the status condition for the primary AMF.

In one instance, the heartbeat exchange is performed using an N14 interface interconnecting the buddy AMF and the primary AMF. In one instance, the heartbeat exchange is performed using a proprietary interface interconnecting the buddy AMF and the primary AMF.

In one instance, initiating, by the buddy AMF, the heartbeat exchange with the primary AMF includes transmitting a heartbeat query to the primary AMF. In one instance, identifying the status condition for the primary AMF by the buddy AMF further includes determining, by the buddy AMF, whether a heartbeat response to the heartbeat query is received; and based on determining that a heartbeat response is not received, identifying a failure of the primary AMF in which the status indication provided to the radio access network node indicates that the primary AMF has failed. In one instance, the status indication includes at least one GUAMI for the primary AMF and identifying information for the buddy AMF. In one instance, the identifying information for the buddy AMF includes at least one of a Fully Qualified Domain Name (FQDN) for the buddy AMF and at least one GUAMI for the buddy AMF.

In one instance, identifying the status condition for the primary AMF by the buddy AMF further include, based on determining that a heartbeat response is received, determining whether one or more status indicators for the primary AMF are included in the heartbeat response and, based on determining that one or more status indicators for the primary AMF are included in the heartbeat response, identifying the status condition for the primary AMF. In various instances, the one or more status indicators indicate at least one of an overload condition of the primary AMF, a load factor value for the primary AMF, a status event for the primary AMF, and a status alarm for the primary AMF.

In one instance, the radio access network node is one of a next generation Node B (gNB) or a central unit control plane (CU-CP) element. In one instance, the method may further include performing one or more actions by the radio access network node based on the status indication.

In one form a buddy access and mobility management function (AMF) is provided that includes at least one memory element for storing data; and at least one processor for executing instructions associated with the data, wherein executing the instructions causes the buddy AMF to perform operations, including initiating, by the buddy AMF, a heartbeat exchange with a primary AMF, identifying a status condition for the primary AMF by the buddy AMF based on the heartbeat exchange, and providing a status indication to a radio access network node by the buddy AMF based on the status condition for the primary AMF.

In summary, techniques herein may provide various advantages over standards-based approaches for handling ANF failures, etc. For example, techniques provided herein address all gaps in the standards-based approaches without introducing new procedures/next generation Application Protocol (NGAP) messages between an AMF and the 5G-AN/NG-RAN node(s). Additionally, techniques provided herein can help to achieve better load balancing that is based on real-time load factor, which can be helpful in avoiding AMF overloading. Additionally, techniques provided herein may offer AMF resiliency for any unplanned failures such as an AMF instance going down, for planned failures for maintenance reasons, for scenarios in which an AMF becomes overloaded and stops responding to new session request(s), etc.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   initiating, by a buddy access and mobility management function (AMF), a heartbeat exchange with a primary AMF by transmitting a heartbeat query message to the primary AMF that includes an indicator indicating a heartbeat query message type, wherein the primary AMF is to respond to the heartbeat query message with a heartbeat response message that is to be received by the buddy AMF;
   identifying a status condition for the primary AMF by the buddy AMF based on the heartbeat exchange; and
   providing a status indication to a radio access network node by the buddy AMF based on the status condition for the primary AMF.

2. The method of claim 1, wherein the heartbeat exchange is performed using an N14 interface interconnecting the buddy AMF and the primary AMF.

3. The method of claim 1, wherein the heartbeat exchange is performed using a proprietary interface interconnecting the buddy AMF and the primary AMF.

4. The method of claim 1, wherein identifying the status condition for the primary AMF by the buddy AMF further comprises:
   determining, by the buddy AMF, whether the heartbeat response message to the heartbeat query message is received; and
   based on determining that the heartbeat response message is not received, identifying a failure of the primary AMF, wherein the status indication provided to the radio access network node indicates that the primary AMF has failed.

5. The method of claim 4, wherein the status indication includes at least one Globally Unique AMF Identifier (GUAMI) for the primary AMF and identifying information for the buddy AMF.

6. The method of claim 5, wherein the identifying information for the buddy AMF includes a Fully Qualified Domain Name (FQDN) for the buddy AMF and at least one GUAMI for the buddy AMF.

7. The method of claim 1, wherein identifying the status condition for the primary AMF by the buddy AMF further comprises:
based on determining that the heartbeat response message is received, determining whether one or more status indicators for the primary AMF are included in the heartbeat response message; and
based on determining that one or more status indicators for the primary AMF are included in the heartbeat response message, identifying the status condition for the primary AMF.

8. The method of claim 7, wherein the one or more status indicators indicate at least one of:
an overload condition of the primary AMF;
a load factor value for the primary AMF;
a status event for the primary AMF; and
a status alarm for the primary AMF.

9. The method of claim 7, wherein providing the status indication to the radio access network node includes transmitting an AMF status indication message to the radio access network node that includes an indicator indicating at least one Globally Unique AMF Identifier (GUAMI) for the primary AMF, and status information for the primary AMF that is based on the one or more status indicators received from the primary AMF.

10. The method of claim 9, wherein the AMF status indication message further includes an indicator indicating a primary AMF status information message type.

11. The method of claim 1, wherein the radio access network node is one of a next generation Node B (gNB) or a central unit control plane (CU-CP) element.

12. The method of claim 1, further comprising:
performing one or more actions by the radio access network node based on the status indication.

13. One or more non-transitory computer readable storage media encoded with instructions that, when executed by a processor, cause the processor to perform operations, comprising:
initiating, by a buddy access and mobility management function (AMF), a heartbeat exchange with a primary AMF by transmitting a heartbeat query message to the primary AMF that includes an indicator indicating a heartbeat query message type, wherein the primary AMF is to respond to the heartbeat query message with a heartbeat response message that is to be received by the buddy AMF;
identifying a status condition for the primary AMF by the buddy AMF based on the heartbeat exchange; and
providing a status indication to a radio access network node by the buddy AMF based on the status condition for the primary AMF.

14. The media of claim 13, wherein identifying the status condition for the primary AMF by the buddy AMF further comprises:
determining, by the buddy AMF, whether the heartbeat response message to the heartbeat query message is received; and
based on determining that the heartbeat response message is not received, identifying a failure of the primary AMF, wherein the status indication provided to the radio access network node indicates that the primary AMF has failed and wherein the status indication includes at least one Globally Unique AMF Identifier (GUAMI) for the primary AMF and identifying information for the buddy AMF including a Fully Qualified Domain Name (FQDN) for the buddy AMF and at least one GUAMI for the buddy AMF.

15. The media of claim 13, wherein identifying the status condition for the primary AMF by the buddy AMF further comprises:
based on determining that the heartbeat response message is received, determining whether one or more status indicators for the primary AMF are included in the heartbeat response message; and
based on determining that one or more status indicators for the primary AMF are included in the heartbeat response message, identifying the status condition for the primary AMF.

16. A buddy access and mobility management function (AMF) comprising:
at least one memory element for storing data; and
at least one processor for executing instructions associated with the data, wherein executing the instructions causes the buddy AMF to perform operations, comprising:
initiating, by the buddy AMF, a heartbeat exchange with a primary AMF by transmitting a heartbeat query message to the primary AMF that includes an indicator indicating a heartbeat query message type, wherein the primary AMF is to respond to the heartbeat query message with a heartbeat response message that is to be received by the buddy AMF;
identifying a status condition for the primary AMF by the buddy AMF based on the heartbeat exchange; and
providing a status indication to a radio access network node by the buddy AMF based on the status condition for the primary AMF.

17. The buddy AMF of claim 16, wherein the heartbeat exchange is performed using an N14 interface interconnecting the buddy AMF and the primary AMF.

18. The buddy AMF of claim 16, wherein identifying the status condition for the primary AMF by the buddy AMF further comprises:
determining, by the buddy AMF, whether the heartbeat response message to the heartbeat query message is received; and
based on determining that the heartbeat response message is not received, identifying a failure of the primary AMF, wherein the status indication provided to the radio access network node indicates that the primary AMF has failed and wherein the status indication includes at least one Globally Unique AMF Identifier (GUAMI) for the primary AMF and identifying information for the buddy AMF including a Fully Qualified Domain Name (FQDN) for the buddy AMF and at least one GUAMI for the buddy AMF.

19. The buddy AMF of claim 16, wherein identifying the status condition for the primary AMF by the buddy AMF further comprises:

based on determining that the heartbeat response message is received, determining whether one or more status indicators for the primary AMF are included in the heartbeat response message; and based on determining that one or more status indicators for the primary AMF are included in the heartbeat response message, identifying the status condition for the primary AMF.

20. The buddy AMF of claim 19, wherein providing the status indication to the radio access network node includes transmitting an AMF status indication message to the radio access network node that includes at least one Globally Unique AMF Identifier (GUAMI) for the primary AMF, and status information for the primary AMF that is based on the one or more status indicators received from the primary AMF.

* * * * *